US011196812B2

(12) United States Patent
Mayer et al.

(10) Patent No.: US 11,196,812 B2
(45) Date of Patent: Dec. 7, 2021

(54) METHOD FOR ESTABLISHING A NETWORK COMMUNICATION IN AN AUTOMATION SYSTEM

(71) Applicant: Endress+Hauser Process Solutions AG, Reinach (CH)

(72) Inventors: Micheal Mayer, Oberwil (CH); Axel Pöschmann, Basel (CH)

(73) Assignee: Endress+Hause Process Solutions AG, Reinach (CH)

( * ) Notice: Subject to any disclaimer, the term of this patent is extended or adjusted under 35 U.S.C. 154(b) by 0 days.

(21) Appl. No.: 16/977,450

(22) PCT Filed: Feb. 14, 2019

(86) PCT No.: PCT/EP2019/053704
§ 371 (c)(1),
(2) Date: Sep. 1, 2020

(87) PCT Pub. No.: WO2019/166233
PCT Pub. Date: Sep. 6, 2019

(65) Prior Publication Data
US 2021/0051200 A1    Feb. 18, 2021

(30) Foreign Application Priority Data
Mar. 1, 2018    (DE) .................. 10 2018 104 698.7

(51) Int. Cl.
*G06F 15/16*    (2006.01)
*H04L 29/08*    (2006.01)
*H04L 29/14*    (2006.01)
(52) U.S. Cl.
CPC .............. *H04L 67/12* (2013.01); *H04L 69/40* (2013.01)

(58) Field of Classification Search
CPC ............................ H04L 67/12; H04L 69/40
See application file for complete search history.

(56) References Cited

U.S. PATENT DOCUMENTS

| 6,035,264 A * | 3/2000 | Donaldson | G06F 9/45512 |
| | | | 702/182 |
| 2009/0319061 A1* | 12/2009 | Schwalbe | H04L 12/40006 |
| | | | 700/79 |
| 2013/0131833 A1* | 5/2013 | Wettlin | G05B 11/01 |
| | | | 700/9 |

FOREIGN PATENT DOCUMENTS

| DE | 102004019253 A1 | 11/2005 |
| DE | 102007035158 A1 | 1/2009 |

(Continued)

*Primary Examiner* — Normin Abedin
(74) *Attorney, Agent, or Firm* — Kelly J. Smith; Endress+Hauser (USA) Holding Inc.

(57) ABSTRACT

The present disclosure relates to a method for establishing a network communication between network participant and a communication apparatus. The communication apparatus is configured to reset the operating system of the communication apparatus based on an image file located in the communication apparatus after turning on or restarting the communication apparatus, and start the operating system based on the image file, and execute a script. The script initiates or controls starting a first frame application, incorporating at least one communication application into the first frame application, and executing, using the communication application, a scan of a first communication network connected to the communication apparatus and ascertaining identification of all network participants deployed in the first communication network, as well as to a communication apparatus for performing the method of the present disclosure.

20 Claims, 1 Drawing Sheet

(56) References Cited

FOREIGN PATENT DOCUMENTS

| DE | 102008027935 A1 | 12/2009 |
|----|-----------------|---------|
| DE | 102015108053 A1 | 11/2016 |
| EP | 2595016 A1 | 5/2013 |

\* cited by examiner

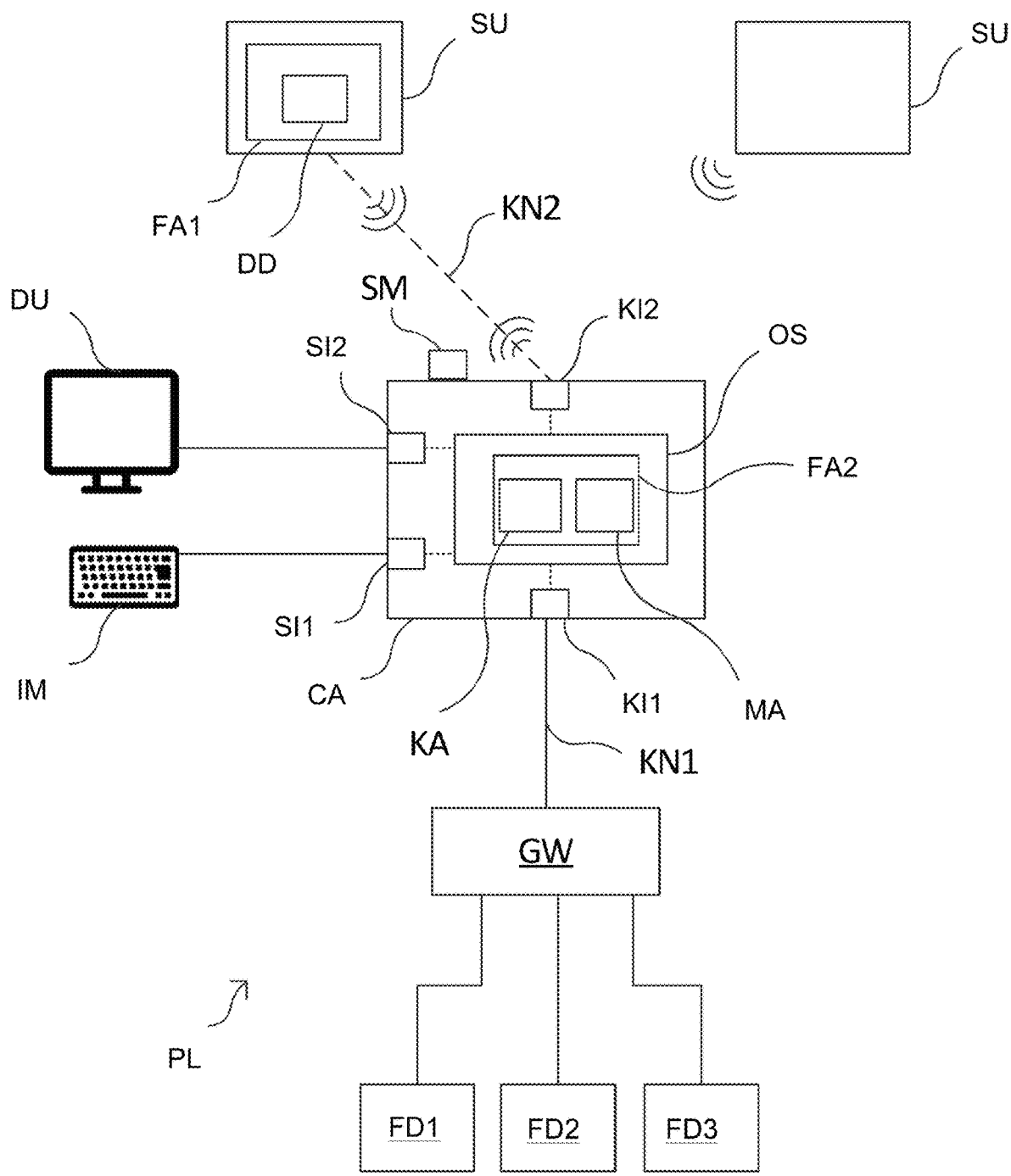

METHOD FOR ESTABLISHING A NETWORK COMMUNICATION IN AN AUTOMATION SYSTEM

CROSS-REFERENCE TO RELATED APPLICATIONS

The present application is related to and claims the priority benefit of German Patent Application No. 10 2018 104 698.7, filed on Mar. 1, 2018 and International Patent Application No. PCT/EP2019/053704 filed on Feb. 14, 2019, the entire contents of which are incorporated herein by reference.

TECHNICAL FIELD

The invention relates to a method for establishing a network communication between at least one network participant, which is deployed in a first communication network, and a communication apparatus in an automation system in the form of an automated plant, wherein the communication apparatus has at least a first communication interface for connecting with at least one network participant via the first communication network, wherein an operating system can run in the communication apparatus and wherein a first frame application, especially an FDT frame application, can run in the operating system.

BACKGROUND

Known in the state of the art are field devices, which are used in industrial plants. Field devices are often applied for automation, especially manufacturing automation. Referred to as field devices are, in principle, all apparatuses, which are applied near to the process and which deliver, or process, process relevant information. Field d1evices are used for registering and/or influencing process variables. Serving for registering process variables are measuring devices, or sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube or pipe or the fill level in a container. Besides the above mentioned measuring devices and actuators, referred to as field devices are also remote I/Os, radio adapters, and, in general, apparatuses, which are arranged at the field level.

A large number of such field devices are produced and sold by the Endress+Hauser group of companies.

In modern industrial plants, field devices are, as a rule, connected with superordinated units via communication networks, such as, for example, fieldbusses (Profibus®, Foundation® Fieldbus, HART®, etc.). The superordinated units are control units, such as, for example, a PLC (programmable logic controller). The superordinated units serve, among other things, for process control, as well as for start-up of the field devices. The measured values registered by the field devices, especially by their sensors, are transmitted via the particular bus system to one or more superordinated unit(s), which, in given cases, process the measured values further and forward them to the control station of the plant. The control station serves for process visualizing, process monitoring and process control via the superordinated units. In addition, also a data transmission from a superordinated unit via the bus system to the field devices is required, especially for configuration and parametering of field devices as well as for operating actuators.

For servicing the field devices, corresponding operating programs (operating tools) are necessary, which run on the superordinated units either on their own (Endress+Hauser FieldCare, Pactware, AMS Fisher-Rosemount, PDM Siemens) or are integrated in applications of the control station (Siemens PSC7, ABB Symphony, Emerson Delta V). The terminology, "servicing", means, among other things, a parametering of the field device, an updating of the field device and/or a querying and visualizing of process data and/or diagnostic data of the field device.

The integration of field devices in such operating programs, or tools, occurs via device drivers, or via device descriptions. Such are provided by the device manufacturers, in order that the superordinated units, or the operating programs, or tools, running in these superordinated units can recognize and interpret the meaning of the information delivered from the field devices. Such an operating program, or tool, in which the device descriptions, or device drivers, are loaded, is also referred to as a frame application.

For a comprehensive servicing of the field devices, special device drivers, so called DTMs ("Device Type Manager"), which correspond to the FDT ("Field Device Tool") specifications, are provided. Many field device manufacturers deliver appropriate DTMs for their field devices. The DTMs encapsulate all variables and functions of their field devices and include, most often, a graphical user interface for servicing the devices within the frame application.

Besides the superordinated units for servicing the field devices, frequently service units in the form of client computers are applied, in which a corresponding frame application is running. These client computers include, for example, laptops, however, also mobile end devices, such as, for example, tablet PCs. They are connected with a fieldbus access unit connected with the fieldbus network for communication with the field devices. Running on the fieldbus access unit is likewise a frame application, especially an FDT frame application. With the help of a special communication driver, for example, the "YCommDTMs" available from the applicant for the frame application "Fieldcare", it is possible to access the frame application of the fieldbus access unit and via this to obtain access to the field devices. For the client computer, the network infrastructure lying between field device and fieldbus access unit is completely transparent, since such need only be known to the fieldbus access unit. The client computer needs only to know the DNS-name or the network address of the fieldbus access unit, as well as a unique identification—, for example, the TAG—of the field device, to which it would like access.

For establishing an FDT frame application solution, for example, for enabling the FDT frame application to access field devices, which are connected to a communication network subordinated too the device, in which the FDT frame application runs, the FDT frame application solution must be manually and carefully constructed. For this, an administrator establishes a project in the FDT frame application, connects devices, for example, by a scan of the communication network, and stores the project. In case the project is run over a longer period of time in the FDT frame application, the administrator must, within certain time intervals, test, whether the project still works as intended. In case of problems, the administrator must do something, for example, restart the FDT frame application or the device, in which the FDT frame application is running. This represents a time-consuming, people-involving process. All previous known FDT solutions are designed for such a direct user intervention.

SUMMARY

Based on the above, an object of the invention is to provide a method and a communication apparatus, which facilitate establishing and maintaining a network communication based on an FDT-solution.

The object is achieved by a method for establishing a network communication between at least one network participant, which is deployed in a first communication network, and a communication apparatus in an automated plant, wherein the communication apparatus has at least a first communication interface for connecting with at least one network participant via the first communication network, wherein an operating system can be run in the communication apparatus and wherein a first frame application, especially an FDT frame application, can run in the operating system, wherein the communication apparatus executes method steps comprising:
resetting the operating system based on an image file located in the communication apparatus after turning on or restarting the communication apparatus;
starting the operating system based on the image file; and
executing a script, whereby the script initiates or controls actions as follows:
I. starting the first frame application;
II. incorporating at least one communication application into the first frame application; and
III. executing a scan of the first communication network by means of the communication application and ascertaining identification of all network participants deployed in the first communication network.

A great advantage of the method of the invention is that it enables a completely automatic establishing of a network communication between the communication apparatus and one or more network participants. An operator requires no knowledge of how to establish a project in the frame application—the communication apparatus does this automatically. The operator need only connect the first communication network to the first communication interface of the communication apparatus and turn on the communication apparatus. The communication apparatus does the rest automatically according to script.

In the case, in which a failure occurs, the operator only has to restart the communication apparatus. The communication apparatus then takes over and re-builds the network communication.

The process flow in the communication apparatus is not visible to the operator and it is not necessary that it be so. It can be provided that the communication apparatus upon successful rebuild outputs an optical signal, for example, a blinking LED or a lighting of an LED in a certain color. In the case of an occurrence of a failure, an optical signal differing therefrom can be output, for example, a different blinking rhythm or a lighting of an LED of another color. The operator is thus limited just to restarting the communication apparatus.

It can be provided that the communication apparatus has besides the first communication interface other communication interfaces, to which other network participants are connected. The method is likewise applicable for these additional communication interfaces. In such case, the communication apparatus sequentially or simultaneously scans all communication networks connected to the communication interfaces, in order to register all network participants.

In the following, the method of the invention will be described using only the first communication interface connected to network participants. It is noted, however, that all variants of the method can be used with any number of other communication interfaces.

An example of a suitable operating system is Microsoft Windows. However, also other established types of operating systems (for example, Linux, Apple OS X, etc.) or operating systems of mobile end devices (for example, Apple iOS, Android, Microsoft Windows Mobile, etc.) can be used.

In connection with the method of the invention, the terminology, "network participant", means, for example, a field device of automation technology. Furthermore, such can also refer to other devices located in the first communication network, for example, gateways, switches, remote I/Os, controllers, etc.

Field devices, which are suitable for use with the method of the invention, have already been described, by way of example, above in the introductory portion of the description.

In a preferred embodiment of the method of the invention, it is provided that the script initiates a state monitoring of the first frame application, wherein the first frame application in the context of the state monitoring retrieves at regular intervals a current device status of each of the network participants. In the context of the state monitoring, the communication apparatus queries on its own the device status of the network participants deployed in the first communication network.

In an advantageous, further development of the method of the invention, it is provided that a service unit is connected with the communication apparatus by means of the first communication interface or by means of a second communication interface of the communication apparatus via a second communication network, wherein a second frame application runs in the service unit. For example, the service unit can be deployed in the first communication network, in the case that a communication with the communication apparatus is provided via the first communication interface.

In a preferred embodiment of the method of the invention, it is provided that the second frame application is connected via the communication application of the first frame application with the at least one network participant. For this, a device driver is provided in the second frame application. Such is, for example, a so-called "YCommDTM". The exact operation of such method, in the case of which the service unit serves as client computer in the first frame application of the communication apparatus, has already been explained above in the introductory portion of the description.

In an advantageous embodiment of the method of the invention, it is provided that the service unit services, especially parameters, the first network participant. In the course of a parametering, parameters of the network participant, which define/determine its functioning, are assigned parameter values. Furthermore, the terminology, "servicing", includes, for example, a querying of measured values, diagnostic data, device status, etc. of the network participant.

In a preferred embodiment of the method of the invention, it is provided that a mobile end device is used as service unit. A mobile end device is, for example, a smart phone or a tablet PC. Alternatively, also a service unit in the form of a "Field Xpert" tablet PC produced and sold by the applicant can be used.

In an advantageous, further development of the method of the invention, it is provided that a monitoring application is implemented in the operating system of the communication apparatus.

In a first variant of the method of the invention, it is provided that the monitoring application checks the operating system and/or hardware of the communication apparatus for failures and wherein in the case of a detected failure the communication apparatus is restarted. The monitoring application checks, for example, as regards the operating system, whether tasks of the operating system are running slow or are paused. Furthermore, the monitoring application checks as regards hardware, whether apparatus components are not running or their functioning is degraded. Because of the restart of the communication apparatus, the operating system is newly installed and the network communication of the communication apparatus newly established. Failures, which occurred during the previous operation, are removed in this way.

In a second variant of the method of the invention, it is provided that the monitoring application checks the frame application for failures and, in the case of a detected failure, the first frame application is terminated and restarted. Also in this case, it is checked whether certain tasks of the the frame application are running slow or are paused. It can also be checked whether data can still enter, exit, via the ports. If no, or only slow, data traffic is detected, then such can indicate a network configuration problem of the communication apparatus.

In a preferred embodiment of the method of the invention, it is provided that the monitoring application terminates and restarts the frame application in regular time intervals. In this way, failures developing over a longer operational time frame are prevented.

In an advantageous, further development of the method of the invention, it is provided that network participants ascertained by scanning the first communication network are stored in a project file. Stored in the project file are, for example, the name of the network participant, its network address and/or the tree structure of the first communication network In a preferred embodiment of the method of the invention, it is provided that the script loads the stored project file into the frame application after the starting of the first frame application. In this way, the network communication does not have to be completely newly established, whereby the communication apparatus can be placed in operation faster than in conventional ways.

In an advantageous embodiment of the method of the invention, it is provided that the script after the starting of the frame application reads out a configuration file stored in the communication apparatus and transmits the read-out data to the frame application for performing the scan. Contained in the configuration file are data, which are transferred to the frame application and which are used by the frame application to configure the network communication. For example, the data is a network address to be used for the communication apparatus.

In a preferred further development of the method of the invention, it is provided that the operating system is reset after restarting the communication apparatus only when a switch means of the communication apparatus is located in a first state of at least two possible states.

In a preferred embodiment of the method of the invention, it is provided that the operating system is not reset after restarting, when the switch means of the communication apparatus is located in a second state, wherein, in such case, the script loads the stored project file into the frame application after the starting of the first frame application.

The switch means, which is, for example, a switch or a button, which is located on the housing of the communication apparatus, permits an efficient construction of the communication apparatus. For example, it can be provided that the switch means is located by default in the second state. In such case, the operating system is only restarted and not reset. When the frame application is started by the script, the project file is loaded, whereby the communication network does not need to be rescanned. This variant is recommended for failures, which occur over a longer operation of the communication apparatus and which can be handled by a simple restart of the communication apparatus, in the case of which, among other things, the working memory of the communication apparatus is erased.

In the case of systematic failures, which cannot be eliminated by a simple restarting of the communication apparatus, the operator actuates the switch means in such a manner that it transfers into the first state. In such case, the operating system is reset and the network communication completely newly established.

Furthermore, the object is achieved by a communication apparatus, comprising at least a first communication interface, which is embodied for communication with at least one network participant, wherein the communication apparatus is embodied to perform the method of the invention.

The communication apparatus is, for example, an industrial PC. Such is preconfigured, so that it is usually not provided that an operator changes configuration settings of the communication apparatus. If such is, however, desired, then the communication apparatus can have interaction interfaces for connecting a display unit, such as, for example, a monitor, and for connecting at least one input means, for example, a keyboard.

In a preferred embodiment of the communication apparatus of the invention, it is provided that the first communication interface is embodied for connecting with a first wired communication network, especially a fieldbus of automation technology. In such case, the first communication network is, for example, a fieldbus of automation technology, for example, a PROFIOUS, Foundation Fieldbus, HART, etc. fieldbus, an Ethernet fieldbus, for example, PROFINET, or an IT communication network.

In an advantageous embodiment of the communication apparatus of the invention, it is provided that the communication apparatus has a second communication interface, which is embodied for connecting with a second, especially wired or wireless, communication network. The wireless communication network uses as protocol, for example, W-Fi, Bluetooth (LE), Zigbee, etc. protocol. It can, however, also be a communication network, which uses a mobile radio network, for example, a GPRS, EDGE, LTE, 4G, 5G, etc. network.

In a preferred embodiment of the communication apparatus of the invention, it is provided that the communication apparatus has a third communication interface, which is embodied for connecting with a third, especially wired or wireless, communication network.

In an advantageous embodiment of the communication apparatus of the invention, it is provided that the communication apparatus is connectable by means of the first communication interface or by means of the third communication interface with an additional network participant, wherein the communication apparatus is embodied to execute operating commands of the additional network participant and/or to transfer information to the additional network participant. The method of the invention, which describes a network communication with a network participant via the first communication network, can be expanded to another, third communication network.

The communication apparatus can be provided with yet a number of other communication interfaces, to which other network participants are connected via other wired or wireless communication networks. The method of the invention is not limited to any maximum number of communication interfaces and network participants.

It can be provided that the service unit and the network participants are in the same communication network.

BRIEF DESCRIPTION OF THE DRAWING

The invention will now be explained in greater detail based on the appended drawing, the sole FIG. of which show as follows:

FIG. 1 shows an example of an embodiment of the communication apparatus of the present disclosure.

DETAILED DESCRIPTION

FIG. 1 shows a subsection of a plant PL of automation technology. Present in the plant PL are a plurality of field devices FD1, FD2, FD3. They serve for registering and/or influencing process variables at process measurement locations of the plant PL. Examples of such field devices FD1, FD2, FD3 have already been given, by way of example, in the introductory portion of the description above.

In the course of the start-up of the field devices FD1, FD2, FD3 and in the course of the general operation of the field devices FD1, FD2, FD3, the field devices collect data and transfer such data, especially in regular time intervals, for example, to a control station of the plant PL. Likewise, the field devices FD1, FD2, FD3 regularly receive data. To this end, the field devices FD1, FD2, FD3 are connected into a first communication network KN1. The first communication network KN1 can have a plurality of segments. In the present example of an embodiment shown in FIG. 1, the segment of the first communication network KN1, to which the field devices FD1, FD2, FD3 are directly connected, is a fieldbus of automation technology, for example, a Profibus PA fieldbus or a Foundation Fieldbus. The field devices are, thus, network participants of the first communication network KN1.

A further network participant in this example of an embodiment is a gateway GW. This interconnects a plurality of segments of the first communication network KN1 and enables also a joining of segments of different network types.

In order to be able to communicate with the field devices FD1, FD2, FD3, usually an FDT frame application is used, which runs on a device, which is connected with the first communication network KN1. The establishing of such a network communication is frequently a very time-consuming procedure. An operator must be well acquainted with the FDT/DTM technology, in order to create an FDT-project for establishing a network communication between the device and the field devices FD1, FD2, FD3.

The communication apparatus CA of the invention supports the user in the establishing and maintaining of the network communication. Communication apparatus CA is, for example, an industrial PC. The communication apparatus CA is preconfigured for the operator as it comes from the factory. The communication apparatus CA includes a first communication interface KI1, by means of which the communication apparatus CA is connected with the first communication network KN1.

After the connecting, the operator starts the communication apparatus CA. A switch means SM is located on the housing of the communication apparatus CA. A first state of the switch means SM is its default position. In the first state, an image file is loaded upon a start of the communication apparatus. The image file contains an image of an operating system OS. The operating system is, for example, Microsoft Windows. By means of the image file, the version of the operating system OS located previously in the communication apparatus CA is reset in that it is over-written, including all programs and data belonging thereto, upon the start of the communication apparatus CA.

After this so-called resetting of the operating system OS, the operating system is started. Immediately after the start of the communication apparatus CA, a script is started. Such a script enables automated start of programs and parameter transfers to the programs. As first step, the script opens a first FDT frame application FA1, for example, the Fieldcare product of the applicant. The first frame application FA1 is likewise installed in the operating system OS by means of the image file.

In a second method step, the script reads a configuration file located in the communication apparatus CA. This contains parameters, which the communication apparatus CA, e.g. the first frame application FA1, requires for connecting with the first communication network KN1, for example, a network address for the communication apparatus. The read-out parameters are then transferred to the operating system OS, or into the first frame application.

In a third method step, the script initiates the incorporating of a communication application KA into the communication apparatus CA. The communication application detects the first communication network KN1 and conducts an automated scan of the first communication network KN1. In such case, all network participants—, in this case, the field devices FD1, FD2, FD3 and the gateway GW—of the first communication network KN1, their network addresses and their types and identification information are ascertained. The communication application KA is especially a communication-DTM ("CommDTM"), which represents a special driver for communication via the specific type of the first communication network KN1.

In a fourth method step, the script initiates the storing of a project file of the first frame application FA1. Contained in the project file is the network structure of the first communication network KN1 ascertained in the third method step.

In an optional fifth method step, the script initiates the starting of a state monitoring (e.g. a condition monitoring) in the first frame application FA1. The state monitoring requests in regular time intervals the device status of all network participants.

Simultaneously with starting the first frame application FA1, the script starts a monitoring application MA in the operating system OS. Such monitors the correct functioning of the hardware components of the communication apparatus CA, the correct functioning of the operating system OS as well as the correct functioning of the first frame application FA1. If a failure of the hardware components or operating system OS is noticed, then the monitoring application MA restarts the communication apparatus CA. In the case of a failure of the first frame application FA1, such is closed and restarted, without it being necessary that the entire communication apparatus CA be restarted. In the restarting of the first frame application FA1, the stored project file is loaded, without necessitating a renewed scan of the first communication network KN1. It can, however, be provided that in the case of repeated restarting a new project is started and the first communication network KN1 scanned anew.

In the case of a restart of the communication apparatus CA or a general turning of the communication apparatus CA on, it can be provided that the operating system is not reset. If, for example, the monitoring application MA detects a hardware failure or a failure of the operating system OS, which can be removed by a restart, then the operating system OS does not need to be reset. To this end, the switch means SM is actuated, such that it is located in a second state. In the second state, the operating system OS is started normally in the course of a (re)start of the communication apparatus CA and then the script is executed. The script initiates then the starting of the first frame application FA1 and the monitoring application MA, as well as the loading of the project file into the first frame application.

The communication apparatus of the invention CA offers the operator considerable advantages: the operator need only connect the first communication network KN1 with the communication apparatus CA, start the communication apparatus CA, and pay attention to the correct state of the switch means SM. The subsequent creating of the FDT-project, thus, the establishing of the network communication as well as the starting of state monitoring, and the monitoring of the correct functioning of the communication apparatus CA, happens completely without need of intervention by the operator—the communication apparatus CA works, so-to-say, as a so-called "blackbox". The operator does not have to make use of any knowledge concerning FDT technology. If the operator would like nevertheless to change settings in the configuration of the communication apparatus CA, then display unit DU and/or servicing unit SU can be connected via servicing interfaces SI located in the communication apparatus.

In order to be able to communicate with the network participants of the first communication network KN1, the operator connects a service unit SU with the communication apparatus CA. In the present example, the communication apparatus CA includes for this a second communication interface KI2, in this case, a wireless interface based on Wi-Fi or a wired interface based on Ethernet. The service unit SU, which, in this case, is a tablet PC, includes a second frame application FA2 having at least one device driver DD. The device driver DD, which is, in the present case, a device driver for a field device, is adapted via a communication-DTM ("YCommDTM") of the second frame application FA2 to be able to access the first frame application FA1, in order to utilize such for communication with one or more of the network participants. In detail, the device driver DD is, for example, a driver for a temperature sensor. The communication-DTM is provided in the service unit SU in order that the device driver can communicate with the first frame application FA1 via the second communication network. The communication-DTM forwards the communication of the device driver DD to the first frame application FA1. From there, the communication is transmitted to the appropriate network participant, in this case, a field device FD2 in the form of a temperature sensor. The response of this network participant is transmitted via this communication path in the opposite direction to the device driver DD.

The network participant can, in this way, be serviced by the service unit SU. The terminology, "servicing" means, for example, a querying of measured values, diagnostic data, device status, etc. of a network participant, or a parametering of the network participant.

The present invention is not limited to the example of an embodiment shown in FIG. 1. Any number of other communication interfaces can be provided in the communication apparatus CA for connecting to a corresponding number of other communication networks. Such can likewise be scanned as described and their network participants ascertained, for the purpose of likewise monitoring the states of these network participants and for servicing these network participants. Likewise it can be provided that the service unit SU is connected with the first communication network KN1 and likewise communicates via the first communication interface KI1 with the communication apparatus and with the network participants.

Translation of German Words and/or Symbols in the Drawing

FIG. 1:
Change "BE" to —SU—;
change "RA" to —FA—;
change "GT" to —DD—;
change "AE" to —DU—;
change "BD" to —SI—;
change "KS" to —KI—;
change "BS" to —OS—;
change "EM" to —IM—;
change "KV" to —CA—;
change "ÜA" to —MA—;
change "AN" to —PL—; and
change "FG" to —FD—.

The invention claimed is:

1. A method for establishing a network communication between at least one network participant, which is deployed in a first communication network, and a communication apparatus in a plant of automation technology, wherein the communication apparatus has at least a first communication interface for connecting with at least one network participant via the first communication network, wherein an operating system can run in the communication apparatus and wherein a first frame application can run in the operating system, wherein the communication apparatus executes method steps comprising:
resetting the operating system based on an image file located in the communication apparatus after turning on or restarting the communication apparatus;
starting the operating system based on the image file; and
executing a script, whereby the script initiates or controls actions as follows:
starting the first frame application;
incorporating at least one communication application in the first frame application; and
executing a scan of the first communication network using the communication application and ascertaining identification of all network participants deployed in the first communication network.

2. The method of claim 1, wherein the script initiates a state monitoring of the first frame application, wherein the first frame application in the context of the state monitoring retrieves at regular intervals a current device status of each of the network participants.

3. The method of claim 1, wherein a service unit is connected with the communication apparatus using the first communication interface or by using a second communication interface of the communication apparatus via a second communication network, wherein a second frame application runs in the service unit.

4. The method of claim 3, wherein the second frame application is connected via the communication application of the first frame application with the at least one network participant.

5. The method of claim 4, wherein the service unit services the first network participant.

6. The method of claim 1, wherein a mobile end device is used as service unit.

7. The method of claim 1, wherein a monitoring application is implemented in the operating system of the communication apparatus.

8. The method of claim 7, wherein the monitoring application checks the operating system or hardware of the communication apparatus for failures and wherein in the case of a detected failure the communication apparatus is restarted.

9. The method of claim 7, wherein the monitoring application checks the frame application for failures and wherein in the case of a detected failure the first frame application is terminated and restarted.

10. The method of claim 7, wherein the monitoring application terminates and restarts the first frame application in regular time intervals.

11. The method of claim 10, wherein network participants ascertained by scanning the first communication network are stored in a project file.

12. The method of claim 10, wherein the script loads the stored project file into the first frame application after the starting of the first frame application.

13. The method of claim 1, wherein the script after the starting of the first frame application reads out a configuration file stored in the communication apparatus and transmits read-out data to the first frame application for performing the scan.

14. The method of claim 1, wherein the operating system is reset after restarting the communication apparatus only when a switch of the communication apparatus is located in a first state of at least two possible states.

15. The method of claim 14, wherein the operating system is not reset after restarting, when the switch of the communication apparatus is located in a second state, wherein the script loads the stored project file in the first frame application after the starting of the first frame application.

16. A communication apparatus, comprising at least a first communication interface, which is embodied for communication with at least one network participant, wherein the communication apparatus is embodied to perform the following method:
resetting the operating system based on an image file located in the communication apparatus after turning on or restarting the communication apparatus;
starting the operating system based on the image file; and
executing a script, whereby the script initiates or controls actions as follows:
starting the first frame application;
incorporating at least one communication application in the first frame application; and
executing a scan of the first communication network using the communication application and ascertaining identification of all network participants deployed in the first communication network.

17. The communication apparatus of claim 16, wherein the first communication interface is embodied for connecting with a first wired communication network, especially a fieldbus of automation technology.

18. The communication apparatus of claim 16, wherein the communication apparatus has a second communication interface, which is embodied for connecting with a second, especially wired or wireless, communication network.

19. The communication apparatus of claim 16, wherein the communication apparatus has a third communication interface, which is embodied for connecting with a third, especially wired or wireless, communication network.

20. The communication apparatus of claim 16, wherein the communication apparatus is connectable by means of the first communication interface or by means of the third communication interface with an additional network participant, wherein the communication apparatus is embodied in such a manner to execute operating commands of the additional network participant or to transfer information to the additional network participant.

\* \* \* \* \*